United States Patent [19]

Tsujimura et al.

[11] Patent Number: 4,808,044
[45] Date of Patent: Feb. 28, 1989

[54] INSERT CUTTER

[75] Inventors: Osamu Tsujimura, Kawasaki; Tatsuo Arai, Kitamoto, both of Japan

[73] Assignee: Mitsubishi Kinzoku Kabushiki Kaisha, Tokyo, Japan

[21] Appl. No.: 43,621

[22] Filed: Apr. 28, 1987

[30] Foreign Application Priority Data

| Apr. 30, 1986 | [JP] | Japan | 61-100483 |
| Nov. 5, 1986 | [JP] | Japan | 61-263344 |
| Nov. 5, 1986 | [JP] | Japan | 61-263346 |

[51] Int. Cl.$^4$ .............................................. B23C 5/06
[52] U.S. Cl. ........................................ 407/42; 407/34; 407/41; 407/55; 407/60; 407/61
[58] Field of Search ................. 407/34, 35, 40, 41, 407/42, 43, 44, 49, 51, 55, 56, 58, 60, 61

[56] References Cited

U.S. PATENT DOCUMENTS

| 1,762,111 | 6/1930 | Weddell | 407/58 |
| 2,367,221 | 1/1945 | Kraus | 407/55 |
| 2,761,196 | 9/1956 | Graves et al. | 407/34 |
| 4,529,338 | 7/1985 | Erkfritz | 407/35 |

Primary Examiner—Frederick R. Schmidt
Assistant Examiner—William E. Terrell
Attorney, Agent, or Firm—Scully, Scott, Murphy & Presser

[57] ABSTRACT

An insert cutter includes a cutter body of a generally circular cross-section having an axis of rotation therethrough. The cutter also includes a plurality of cutter inserts releasably mounted on a periphery of the cutter body in circumferentially spaced relation to one another. Each of the cutter inserts has a main cutting edge indexed in its peripheral cutting position. The cutter inserts are disposed so that the indexed main cutting edge of at least one of the cutter inserts is provided with an axial rake angle different from axial rake angles of the indexed main cutting edges of the other cutter inserts.

9 Claims, 6 Drawing Sheets

INSERT CUTTER

BACKGROUND OF THE INVENTION

1. Field of the Invention

The present invention relates to an insert cutter such as a face milling cutter and a side milling cutter, and particularly to a cutter which is hardly subjected to chattering.

2. Prior Art

Generally, when an insert cutter such as a face milling cutter is used to process a workpiece, each of the cutter inserts mounted on a cutter body engages the workpiece and disengages therefrom as the cutter body rotates, to result in an interrupted cutting. Therefore, the cutter body may be subjected to such impact force as to cause chattering, so that the cutter inserts may be susceptible to chipping. In view of the foregoing, an insert cutter which is hardly subjected to chattering has long been desired.

Figure 1:
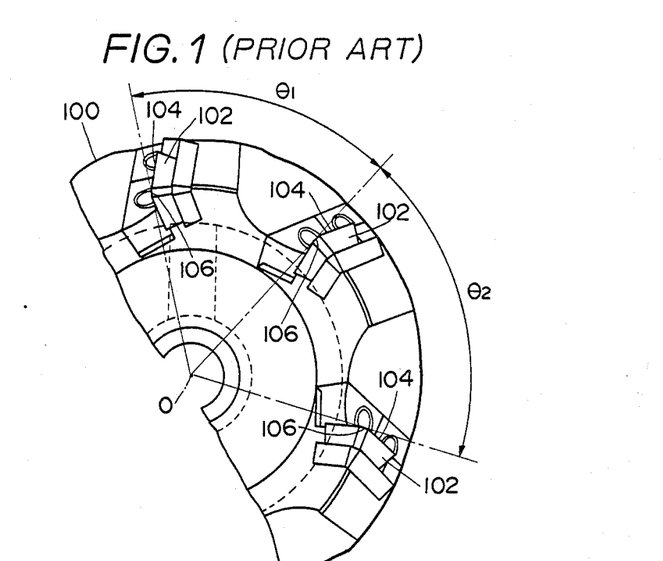
FIG. 1 is a partial cutaway end view of a conventional insert cutter.

FIG. 1 shows one conventional face milling cutter which comprises a cutter body 100 having an axis O of rotation therethrough and a plurality of cutter inserts 102 releasably mounted on a periphery of the cutter body 100 at its forward end, the cutter inserts 102 being circumferentially spaced from each other with unequal central angles, as designated at $\theta_1$ and $\theta_2$. Each of the cutter inserts 102 includes a plurality of main and auxiliary cutting edges 104 and 106, and is disposed so that one of the auxiliary cutting edges 106 thereof is indexed in its end cutting position while one of the main cutting edges 104 thereof is indexed in its peripheral cutting position with prescribed radial, axial and corner angles.

In the face milling cutter described above, the indexed main cutting edge 104 of each cutter insert 102 carries out roughing while the indexed auxiliary cutting edge 106 thereof carries out finishing, and therefore a smooth finished surface can be obtained. Further, inasmuch as the plurality of cutter inserts 102 are spaced circumferentially of the cutter body 100 with the unequal central angles $\theta_1$ and $\theta_2$, chips of unequal thicknesses are alternately produced during cutting operation. For this reason, the cutter body 100 is subjected to impact force of irregular levels at irregular periodic time intervals, and hence the cutter is prevented from being resonated with a machine tool to some degree. However, the face milling cutter has still been resonated with the machine tool, and therefore the cutter body 100 has not been sufficiently prevented from being subjected to chattering.

SUMMARY OF THE INVENTION

It is therefore an object of the present invention to provide an insert cutter in which a cutter body is hardly subjected to chattering, so that the cutter inserts are successfully prevented from being subjected to chipping.

According to the present invention, there is provided an insert cutter comprising a cutter body of a generally circular cross-section having an axis of rotation therethrough, and a plurality of cutter inserts releasably mounted on a periphery of the cutter body in circumferentially spaced relation to one another, each of the cutter inserts having a main cutting edge indexed in a peripheral cutting position, the cutter inserts being disposed so that the indexed main cutting edge of at least one of the cutter inserts is provided with an axial rake angle different from axial rake angles of the indexed main cutting edges of the other cutter inserts.

DESCRIPTION OF THE PREFERRED EMBODIMENTS OF THE INVENTION

Various embodiments of the present invention will now be described with reference to FIGS. 2 to 17 of the accompanying drawings in which the same reference characters are used to designate like parts or elements.

Referring to FIGS. 2 to 8, an insert face milling cutter, generally designated by the reference numeral 10, in accordance with one embodiment of the present invention comprises a cutter body 12 adapted to be fixedly secured to a machine spindle so that the cutter body 12 can be rotated in the direction of the arrow R about an axis O therethrough. The cutter body 12 includes a plurality of, say six, pockets 14 formed in its circumferential surface in circumferentially spaced relation to one another. Each pocket 14 has a recess opening to both the circumferential surface and a forward end face of the cutter body 12. In the illustrated embodiment, the recesses are classified into first and second recesses 16A and 16B disposed alternately in the circumferential direction of the cutter body 12. Each first recess 16A has a bottom facing generally in the direction of rotation of the body 12 while each second recess 16B has a bottom facing in a direction slightly inclined from the direction in which the bottom of each first recess 16A faces.

Figure 2:
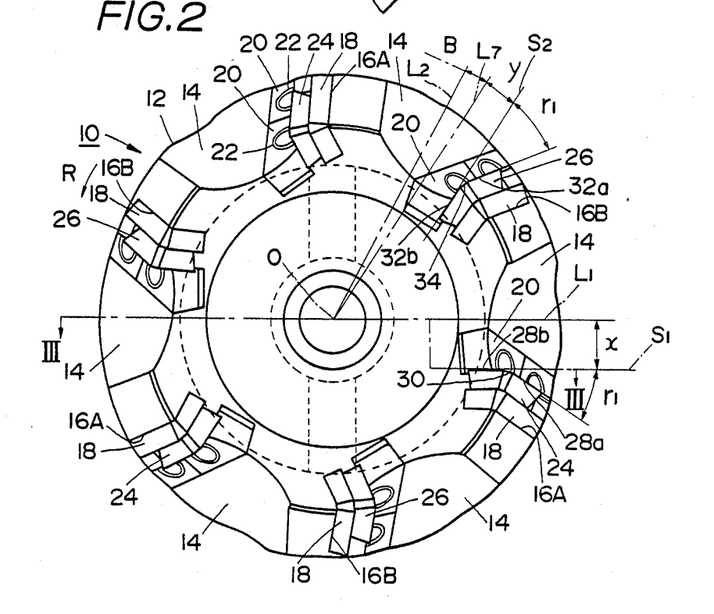
FIG. 2 is an end view of an insert cutter in accordance with the present invention.
Figure 3:
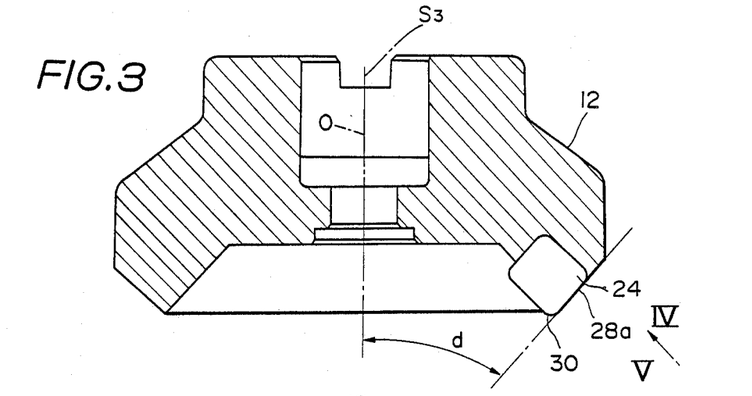
FIG. 3 is a cross-sectional view of the cutter of FIG. 2 taken along line III—III of FIG. 2.

A cutter insert is received in each recess through a support member 18 interposed therebetween, and releasably secured to the cutter body 12 through wedge members 20 fixed to the cutter body 12 by clamp screws 22, the cutter insert received in the first recess 16A being designated at 24 while the insert received in the second recess 16B is designated at 26. All the inserts 24 and 26 are of identical size and shape. Each insert 24, 26 comprises a generally quadrilateral plate defined by a flat front face, a flat rear face disposed generally parallel to the front face, and four side faces. Each of the side faces is sloping inwardly in a direction away from the front face. Four corners of the insert 24, 26 are removed to provide four corner faces, each of the corner faces being sloping inwardly in a direction away from the front face. Each insert 24, 26 has four main cutting edges each defined by the front face and a respective one of the side faces, and four auxiliary cutting edges each defined by the front face and a respective one of the corner faces. Those portions of the front face disposed adjacent to and extending along the main cutting edges serve as respective rake surfaces for the main cutting edges.

Each insert 24 is disposed in such a manner that one of the main cutting edges, which will be designated at 28a, is indexed in its peripheral cutting position while one of the auxiliary cutting edges, designated at 30, is indexed in its end cutting position, as shown in FIG. 3. Similarly, each insert 26 is disposed in such a manner that one of the main cutting edges, which will be designated at 32a, is indexed in its peripheral cutting position while one of the auxiliary cutting edges, designated at 34, is indexed in its end cutting position.

Further, in the illustrated embodiment, the indexed main cutting edge 28a of the insert 24 is provided with a positive axial rake angle $A_a$ while the indexed main cutting edge 32a of the insert 26 is provided with a positive axial rake angle $A_b$ larger than the axial rake angle $A_a$ of the indexed main cutting edge 28a of the insert 24.

Namely, suppose six lines $L_1, L_2 \ldots$ (only $L_1$ and $L_2$ are shown) which extend radially outwardly of the body 12 from the axis O thereof so as to divide the periphery of the cutter body 12 into six equal parts. That main cutting edge 28b of the insert 24 which extends radially inwardly of the body 12 from the indexed auxiliary cutting edge 30 is disposed on a plane $S_1$ spaced by a distance x from the line $L_1$ in the direction opposite to the direction R of rotation of the body 12 and disposed in parallel relation to the axis O of the body 12. That main cutting edge 32b of the insert 26 which extends radially inwardly from the indexed auxiliary cutting edge 34 is disposed on a plane $S_2$ spaced by a distance y from a line $L_7$ in the direction opposite to the direction R of rotation of the body 12 and disposed in parallel relation to the axis O of the body 12, the line $L_7$ being inclined from the above-mentioned line $L_2$ in the direction opposite to the direction R of rotation of the body 12 at a prescribed angle B. In the foregoing, the distances x and y and the angle B are determined in such a manner that the respective indexed auxiliary cutting edges 30 and 34 of all the cutter inserts are just positioned on six lines which extend radially outwardly of the body 12 from the axis O thereof so as to divide the periphery of the cutter body 12 into six equal parts.

Figure 4:
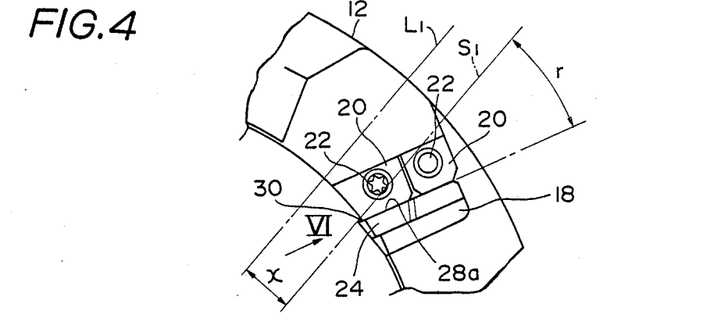
FIG. 4 is a partial cutaway view of the cutter of FIG. 2 as seen in the direction indicated by arrow IV of FIG. 3.
Figure 5:
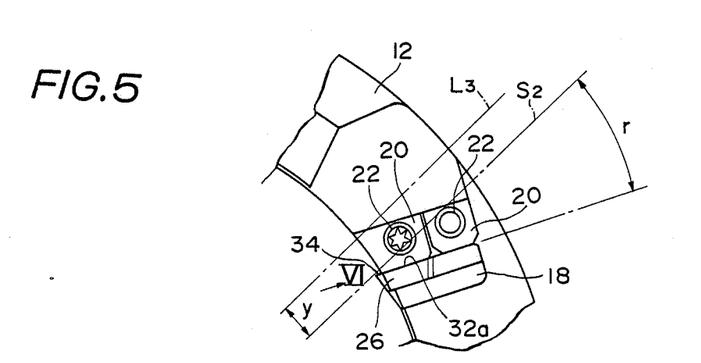
FIG. 5 is a partial cutaway view of the cutter of FIG. 2 as seen in the direction indicated by arrow V of FIG. 3.
Figure 6:
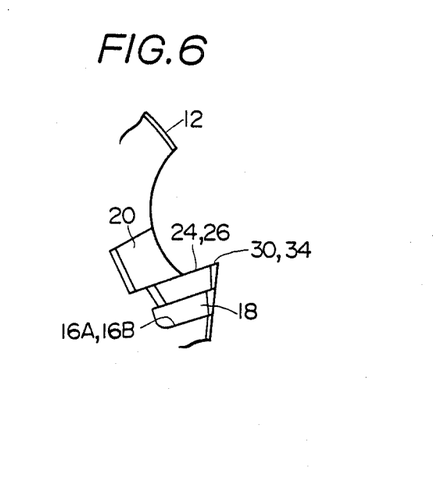
FIG. 6 is a partial cutaway view of the cutter of FIG. 2 as seen in the directions indicated by arrows VI of FIGS. 4 and 5.
Figure 7:
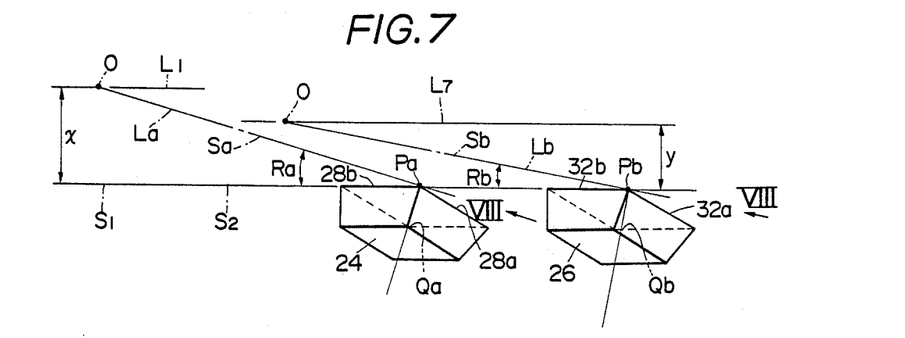
FIG. 7 is a schematic end view for showing the disposition of two cutter inserts of the cutter of FIG. 2.

The indexed main cutting edge 28a, 32a of the cutter insert 24, 26 is, as shown in FIGS. 4 and 5, inclined in the direction opposite to the direction of rotation of the body 12 at an angle of r with respect to a respective one of the planes $S_1$ and $S_2$, and is, as shown in FIG. 3, inclined forwardly toward the axis O of the body 12 at an angle d with respect to each of planes $S_3$ extending axially of the body 12 and disposed perpendicularly to the planes $S_1$ and $S_2$, respectively. Thus, as shown in FIG. 2, the indexed main cutting edges 28a and 32a of the inserts 24 and 26 are respectively inclined from the planes $S_1$ and $S_2$ in the direction opposite to the direction R of rotation of the body 12 at an angle $r_1$. In the foregoing, the angles r and d are determined so that the indexed auxiliary cutting edges 30 and 34 of all the cutter inserts are disposed substantially in a common plane perpendicular to the axis O of rotation of the cutter body 12.

With this arrangement, a radial rake angle $R_a$ of the indexed main cutting edge 28a of each cutter insert 24 is defined by the plane $S_1$ and a line $L_a$ extending radially outwardly from the axis O of the body 12 and passing through an arbitrary point $P_a$ on the indexed main cutting edge 28a while a radial rake angle $R_b$ of the indexed main cutting edge 32a of each cutter insert 26 is defined by the plane $S_2$ and a line $L_b$ extending radially outwardly from the axis O of the body 12 and passing through an arbitrary point $P_b$ on the indexed main cutting edge 32a. The radial rake angles $R_a$ and $R_b$ are selected to be positive and determined so that the radial rake angle $R_a$ is larger than the radial rake angle $R_b$.

Figure 8:
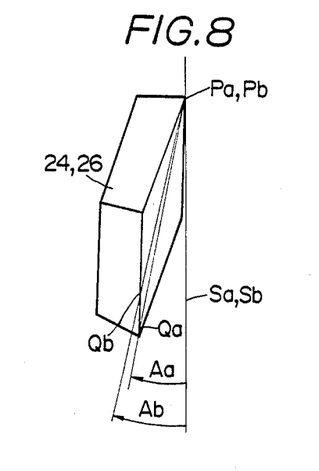
FIG. 8 is a view of the inserts of FIG. 7 as seen in the directions indicated by arrows VIII of FIG. 7.

And, as shown in FIG. 8, the axial rake angle $A_a$ of the indexed main cutting edge 28a of each cutter insert 24 is defined by a plane $S_a$ passing through the axis O of the body and including the line $L_a$ and the front face of the insert 24. Specifically, suppose a point $Q_a$ at which a line extending from the point $P_a$ perpendicularly to the plane $S_a$ intersects that cutting edge disposed in opposed relation to the point $P_a$. Then, the axial rake angle $A_a$ will be defined by the plane $S_a$ and the line $P_a$-$Q_a$, as shown in FIG. 8. The axial rake angle $A_b$ of the indexed main cutting edge 32a of each cutter insert 26 is also defined by a plane $S_b$ passing through the axis O of the body 12 and including the line $L_b$ and the front face of the insert 26. Similarly, suppose a point $Q_b$ at which a line extending from the point $P_b$ perpendicularly to the plane $S_b$ intersects that cutting edge disposed in opposed relation to the point $P_b$. Then, the axial rake angle $A_b$ will be defined by the plane $S_b$ and the line $P_b$-$Q_b$, and, as seen from FIG. 8, the angle is larger than the axial rake angle $A_a$.

In the milling cutter described above, the inserts 24 and 26 are disposed so that the axial rake angle $A_a$ of the indexed main cutting edge 28a of each insert 24 is different from the axial rake angle $A_b$ of the indexed main cutting edge 32a of each insert 26, and that the radial rake angle $R_a$ of the indexed main cutting edge 28a of each insert 24 is different from the radial rake angle $R_b$ of the indexed main cutting edge 32a of each insert 26. Therefore, when each cutter insert 24 engages the workpiece, the indexed main cutting edge 28a of the cutter insert 24 is subjected to impact force different from that exerted on the indexed main cutting edge 32a of each cutter insert 26 when each insert 26 engages the workpiece. For this reason, the cutter body 12 is subjected to impact force exerted in various directions.

Accordingly, the cutter body 12 is not resonated with the machine tool to be prevented from being subjected to chattering, so that the cutter inserts are not susceptible to chipping.

Further, the axial rake angle $A_b$ of the indexed main cutting edge 32a of each insert 26 is positive and larger than the axial rake angle $A_a$ of the indexed main cutting edge 28a of each insert 24. Accordingly, as compared with an insert milling cutter wherein the main cutting edges of the inserts are indexed so as to have equal axial rake angles equivalent to the above smaller axial rake angles $A_a$ of the inserts 24, the above cutter is advantageous in that chips produced during cutting operation can be easily released, thereby reducing the cutting loads exerted on the cutter body 12 substantially. Further, the respective cutter inserts are disposed in the same position relative to the planes $S_1$ and $S_2$. Consequently, upon forming the recesses 16A and 16B in which the inserts 24 and 26 are respectively accommodated, the disposition of the planes $S_1$ and $S_2$ are first determined, and then the recesses of identical shape can be formed in the identical position by making reference to planes $S_1$ and $S_2$. Therefore, the recesses can be formed in the cutter body 12 very easily.

In the foregoing, the radial rake angles for the indexed main cutting edges of all the inserts may be determined so as to be equal to each other. The angles r and d may be changed variously to provide various axial and radial rake angles. The inserts may be disposed in such a manner that two inserts 24 are arranged between two inserts 26 spaced circumferentially of the body 12. Further, although in the above embodiments, the dimensions x and y are determined so that the auxiliary cutting edges 30 and 34 are disposed circumferentially equally spaced relation to one another, the circumferential distances between each adjacent pair of auxiliary cutting edges may be different from each other. Further, in the above cutter, the inserts may have three or more different axial rake angles.

Figure 9:
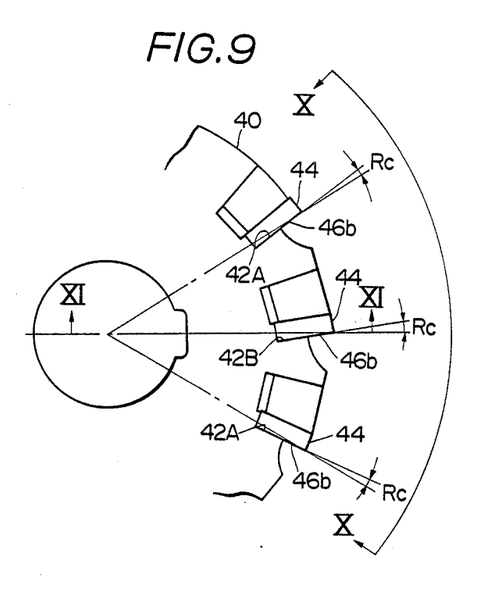
FIG. 9 is a partial cutaway view of a modified insert cutter in accordance with the present invention.
Figure 10:
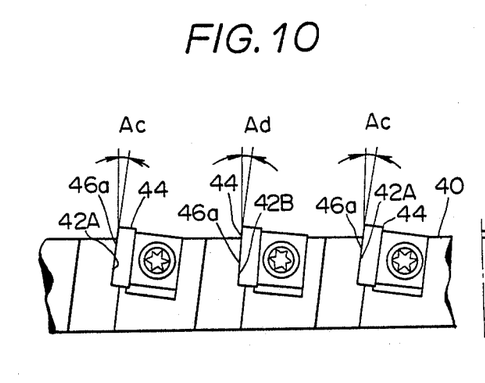
FIG. 10 is a partial cutaway side elevational view of the cutter of FIG. 9 as seen from the line X—X of FIG. 9.
Figure 11:
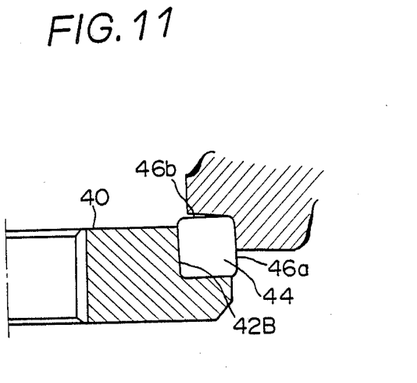
FIG. 11 is a cross-sectional view of the cutter of FIG. 9 taken along the line XI—XI of FIG. 9.
Figure 12:
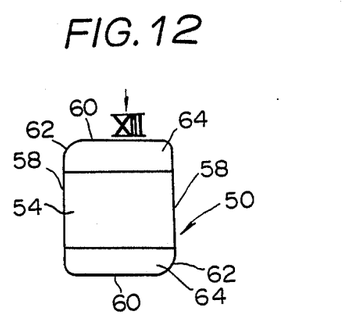
FIG. 12 is a plan view of one cutter insert for use in another modified insert cutter in accordance with the present invention.

FIGS. 9 to 11 show a half side milling cutter in accordance with another embodiment of the present invention. The cutter comprises a disk-shaped cutter body 40 having plural pairs of third and fourth recesses 42A and 42B formed alternately in a circumferential surface thereof, the recesses being disposed circumferentially spaced relation to one another. Cutter inserts 44 of identical size and shape are received in and releasably attached to the recesses 42A and 42B, respectively, so that two main cutting edges 46a and 46b of each insert 44 are indexed in peripheral and face cutting positions, respectively. The recesses 42A and 42B are formed so that the indexed main cutting edges 46a and 46b of all the inserts 44 have equal radial rake angles $R_c$, and that the inserts 44 accommodated in the third recesses 42A have axial rake angles $A_c$ while the inserts 44 accommodated in the fourth recesses 42B have axial rake angles $A_d$ different from the axial rake angles $A_c$.

In the half side milling cutter described above, the axial rake angle $A_c$ of each insert 44 received in the third recesses 42A and the axial rake angle $A_d$ of each insert received in the fourth recesses 42B are different from each other, and hence the indexed face cutting edges 46b of the cutter inserts 44 are subjected to impact forces exerted in different directions. Consequently, the cutter body 40 is prevented from being subjected to chattering, thereby preventing the cutter inserts 44 from being subjected to chipping during cutting operation.

Figure 13:
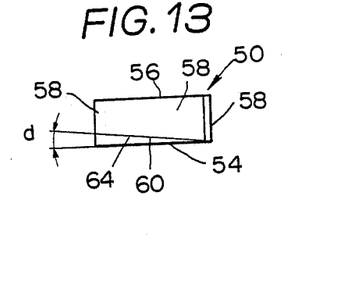
FIG. 13 is a view of the cutter insert of FIG. 12 as seen in the direction indicated by arrow XIII of FIG. 12.
Figure 14:
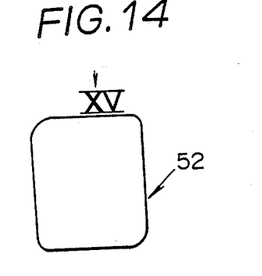
FIG. 14 is a plan view of the other cutter insert for use in said another modified cutter.
Figure 15:
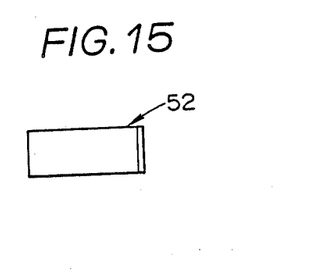
FIG. 15 is a view of the cutter insert of FIG. 14 as seen in the direction indicated by arrow XV of FIG. 14.

Although in the foregoing, recesses of two different groups are formed in the cutter body 40 so that the cutting edges of the inserts 44 have two different axial rake angles, inserts of different shapes may be received in recesses of identical shape disposed circumferentially equally spaced relation to one another. FIGS. 12 to 15 show such two different inserts 50 and 52 which are to be disposed alternately in the circumferential direction of the cutter body. The insert 50 comprises a square plate defined by a front face 54, a rear face 56 and four side faces 58, and the insert 50 includes a pair of parallel opposed marginal ridges serving as respective main cutting edges 60. A pair of opposed corner marginal ridges of the front face 54 serve as respective auxiliary cutting edges 62. Those marginal portions of the front face disposed adjacent and extending along the main cutting edges 60 serve as respective rake surfaces 64 for the main cutting edges 60. Each rake surface 64 is inclined toward the rear face 56 at the angle d, as shown in FIG. 13, as the rake surface approaches a respective one of the auxiliary cutting edges 62. The remaining portion of the front face other than the rake surfaces 64 is generally parallel to the rear face 56. The insert 60 is disposed so that one of the main cutting edges is indexed in the peripheral cutting position while that auxiliary cutting edge disposed adjacent to the indexed main cutting edge is indexed in its face cutting position. On the other hand, the insert 52 comprises a square plate defined by a flat rear face, a flat front face generally parallel to the rear face and four side faces, and is disposed in a conventional manner. With this construction, the cutter inserts are disposed so that the axial rake angle of the indexed main cutting edge of each insert 50 is greater by the angle d than the axial rake angle of the indexed main cutting edge of each insert 52.

Figure 16:
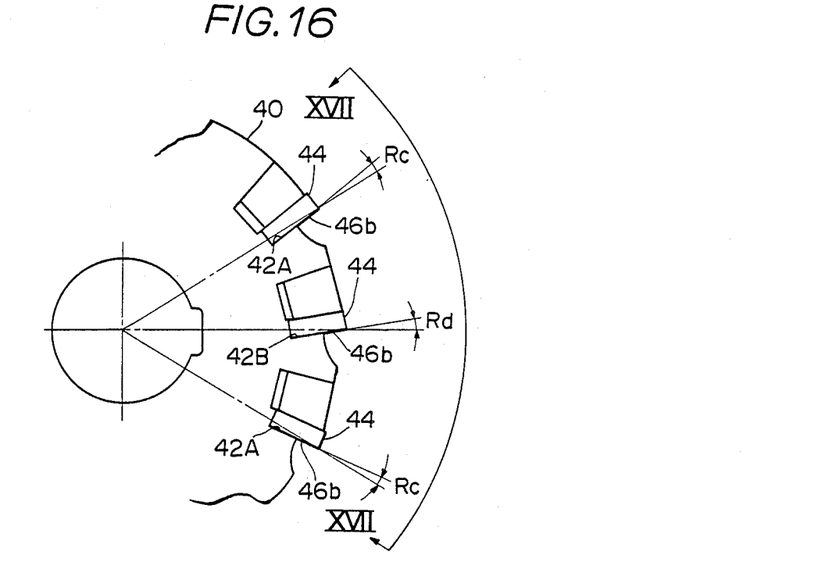
FIG. 16 is a partial cutaway view of a further modified insert cutter in accordance with the present invention.
Figure 17:
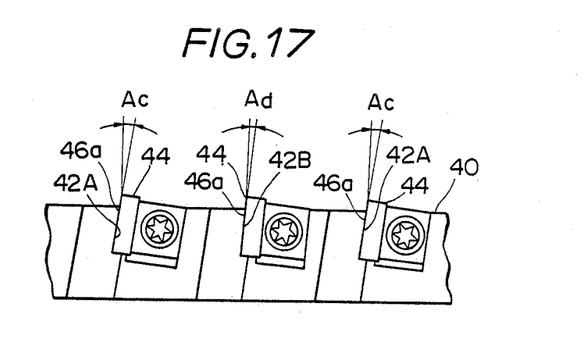
FIG. 17 is a partial cutaway side elevational view of the cutter of FIG. 16 as seen from the line XVII—XVII of FIG. 16.

FIGS. 16 and 17 show a half side milling cutter in accordance with a further modified embodiment of the present invention which differs from the cutter of FIGS. 9 to 11 in that radial rake angles $R_c$ of the indexed cutting edges of the inserts 44 accommodated in the third recesses 42A are different from radial rake angles $R_d$ of the indexed cutting edges of the inserts 44 accommodated in the fourth recesses 42B.

Obviously many modifications and variations of the present invention are possible in the light of the above teachings. It is therefore to be understood that within the scope of the appended claims, the invention may be practiced otherwise than as specifically described.

What is claimed is:

1. An inserted tooth milling cutter comprising:
   a cutter body of a generally circular cross-section having an axis of rotation therethrough; and
   first and second cutter inserts of an identical shape releasably mounted on a periphery of said cutter body in circumferentially spaced relation to each other, each insert having a first main cutting edge indexed in a peripheral cutting position, an auxiliary cutting edge indexed in an end cutting position and a second main cutting edge extending radially inwardly of said body from said indexed auxiliary cutting edge;
   the second main cutting edge of said first insert being located on a first reference plane disposed parallel to the axis of said body and spaced circumferentially of said body from one of partitioning radial lines dividing the periphery of said body into equal parts, the second main cutting edge of said second insert being located on a second reference plane disposed parallel to the axis of said body and spaced circumferentially of said body from a reference line which is inclined circumferentially of said body from another partitioning line; said inserts being disposed so that said indexed main cutting edge of said first insert is provided with axial and radial rake angles different from axial and radial rake angles of the indexed main cutting edge of said second insert, and that said auxiliary cutting edges of said inserts are disposed in a common plane perpendicular to said axis of said body.

2. A milling cutter according to claim 1, in which said first reference plane is spaced in a direction opposite to the direction of rotation of said body from said one partitioning radial line, said second reference plane being spaced from said reference line in the direction opposite to the direction of rotation of said body, said second reference line being inclined from said another partitioning line in the direction opposite to the direction of rotation of said body.

3. A milling cutter according to claim 1, in which the axial rake angles of the indexed main cutting edges of said cutter inserts are positive, the axial rake angle of the indexed main cutting edge of said first insert being smaller than the axial rake angle of the indexed main cutting edge of said second insert.

4. A milling cutter according to claim 3, in which the radial rake angles of the indexed main cutting edges of said cutter inserts are positive, the radial rake angle of the indexed main cutting edge of said first insert being larger than the radial rake angle of the indexed main cutting edge of said second insert.

5. A milling cutter according to claim 1, further comprising at least one third cutter insert having a main cutting edge indexed in a peripheral cutting position and an auxiliary cutting edge indexed in an end cutting position.

6. A milling cutter according to claim 5, in which a plurality of said inserts are disposed on the periphery of said body in circumferentially equally spaced relation to one another.

7. A milling cutter according to claim 5, in which a plurality of said inserts are disposed on the periphery of said body in circumferentially unequally spaced relation to one another.

8. A milling cutter according to claim 5, in which a plurality of said inserts are disposed on the periphery of said body in such a manner that said auxiliary cutting edges of said inserts are circumferentially equally spaced to one another.

9. A milling cutter according to claim 1, in which a plurality of said first inserts and a plurality of said second inserts are disposed on the periphery of said body in such a manner that the first and second inserts are disposed alternately.

* * * * *